United States Patent [19]

Woods

[11] Patent Number: 5,380,456

[45] Date of Patent: Jan. 10, 1995

[54] STABILIZATION OF AQUEOUS PERSALT SOLUTIONS

[75] Inventor: William G. Woods, Riverside, Calif.

[73] Assignee: United States Borax & Chemical Corporation, Los Angeles, Calif.

[21] Appl. No.: 830,046

[22] Filed: Jan. 31, 1992

Related U.S. Application Data

[63] Continuation-in-part of Ser. No. 473,508, Feb. 1, 1990, abandoned.

[51] Int. Cl.⁶ .............................................. C01B 15/043
[52] U.S. Cl. .................. 252/186.27; 252/186.3; 252/186.31; 252/95
[58] Field of Search ............ 252/186.29, 186.3, 186.31

[56]  References Cited

U.S. PATENT DOCUMENTS

| 2,012,462 | 9/1932 | Alexander et al. ................ 23/251 |
| 3,801,512 | 4/1974 | Solenberger .................. 252/186.27 |
| 4,238,192 | 12/1980 | Kandathil ........................... 8/111 |
| 4,347,149 | 8/1982 | Smith et al. ...................... 252/102 |
| 4,396,734 | 8/1983 | Williams et al. ..................... 524/89 |
| 4,900,468 | 2/1990 | Mitchell et al. ..................... 252/95 |
| 5,149,463 | 9/1992 | Peterson ...................... 252/301.21 |
| 5,180,514 | 1/1993 | Farr et al. ........................... 252/99 |

FOREIGN PATENT DOCUMENTS

| 0209228 | 1/1987 | European Pat. Off. ........ 252/186.27 |
| 0349153 | 1/1990 | European Pat. Off. ........ 252/186.27 |

*Primary Examiner*—Robert L. Stoll
*Assistant Examiner*—Joseph D. Anthony
*Attorney, Agent, or Firm*—James R. Thornton

[57] ABSTRACT

Stable, concentrated aqueous persalt solutions are provided in which the stabilizing agent is a water-soluble carbazolesulfonate, diphenylamine sulfonate or N-phenylaminonaphthalene sulfonate. Preferred compositions contain sodium perborate, chelating agent, a solubilizing agent and an acid phosphate ester surfactant.

22 Claims, No Drawings

STABILIZATION OF AQUEOUS PERSALT SOLUTIONS

This is a continuation-in-part of copending application Ser. No. 07/473,508 filed on Feb. 1, 1990 now abandoned.

This invention relates to the stabilization of aqueous peroxy bleach solutions, especially persalt solutions containing sodium perborate or sodium percarbonate.

BACKGROUND OF THE INVENTION

Liquid laundry products such as liquid detergents and liquid bleach formulations have become increasingly popular in the last few years. However, aqueous liquid detergent formulations currently available do not contain a peroxy bleach system such as is found in powdered detergents based on sodium perborate because of poor storage stability of the peroxide in the aqueous media. Although sodium perborate has been popular as a bleaching agent for powdered detergent formulations for many years in Europe, it has only recently found acceptance in the United States as a bleach for powdered detergents. There is a need, however, for stable, concentrated water-based persalt bleaching compositions which have a shelf life adequate to provide sufficient oxidizing peroxygen bleach in a commercial product. Such concentrated solutions are necessary so that a liquid laundry bleach, when diluted in the washing medium, will provide a concentration of active oxygen sufficient to provide adequate bleaching.

The solubility of sodium perborate in water at 20° C. is 2.25% (corresponding to 0.23% active oxygen); however, it is known that the perborate solubility can be increased by use of solubilizing agents such as the alkali metal phosphates, boric acid, tartaric and citric acids as well as mineral acids, such as sulfuric acid. Although the perborate content can be increased by use of such cosolutes, the problem of adequate shelf stability remains of concern.

It has been proposed that the addition of a chelating agent or sequestrant can enhance the stability of sodium perborate in aqueous formulations by removing catalytic metal ions. Examples of such chelating agents or sequestrants include salts of ethylenediamine tetraacetic acid and complex organo-phosphates, such as the alkali metal salts of amino methylenephosphonic acid as disclosed in U.S. Pat. Nos. 3,234,140 and 4,477,390. The pentasodium salt of diethylenetriamine penta(methylene phosphonic) acid, which is available as DEQUEST® 2066 from Monsanto Chemical Co., is an example of such complex organo-phosphates.

Other stabilizer systems for peroxide solutions are inorganic salts of polybasic acids such as potassium polyphosphates, described in U.S. Pat. No. 3,553,140, quaternary ammonium salts described in U.S. Pat. No. 3,996,151, and picolinic or quinaldic acid which are described as stabilizers for organo peroxyacid bleach compositions in U.S. Pat. No. 3,956,159.

U.S. Pat. No. 2,012,462 discloses stabilization of peroxide solutions by use of a mixture of a salt of pyrophosphoric acid and an aromatic amine sulphonate in which the amino nitrogen may be substituted with an alkyl or aralkyl group. It has been found, however, that this stabilizer system is not suitable for concentrated aqueous peroxy solutions based on sodium perborate.

DESCRIPTION OF THE INVENTION

This invention provides concentrated, stable aqueous persalt containing bleaching compositions containing a specific class of stabilizers. Accordingly, this invention comprises a stable, concentrated aqueous persalt solution comprising about 5 to 30% sodium perborate or sodium percarbonate, about 0 to 5% chelating agent, about 3 to 30% solubilizing agent, and about 0.001 to 1.0% of a water soluble salt of a stabilizing agent of a formula selected from

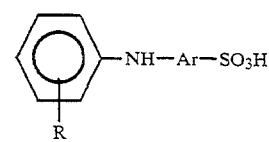

and

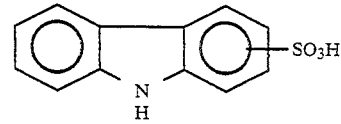

where Ar is phenyl or naphthyl and R is hydrogen, nitro or chloro; said percentages are by weight. The balance of the formulation is water, although other functional ingredients can be included to provide desirable properties or functions in the composition, such as for example, surfactants, builders, fragrances, activators, etc.

The persalt component of the formulation is preferably sodium percarbonate or sodium perborate. The sodium perborate can be added as the monohydrate or tetrahydrate or formed in situ by addition of hydrogen peroxide, boric acid or borax, and sodium hydroxide. The aqueous formulations of this invention contain about 5 to 30% sodium perborate or sodium percarbonate (ignoring the water of hydration) and preferably contain from about 8 to about 25% of the perborate or percarbonate.

In order to increase the solubility of the perborate or the percarbonate in the aqueous formulation, a solubilizing agent is included. Such solubilizing agents can be phosphoric acid or alkali metal phosphates such as sodium dihydrogen phosphate, organic acids such as citric, glucaric, and tartaric acids, and inorganic acids such as boric acid or sulfuric acid. The preferred solubilizing agents are phosphoric acid and the alkali metal phosphates, especially sodium dihydrogen phosphate, and boric acid.

In order to obtain a concentrated solution of the perborate or percarbonate, the solubilizing agent should be present in an amount of from about 3 to 30% by weight. Preferably, when sodium dihydrogen phosphate or boric acid are used as the solubilizing agent, from about 10 to 20% by weight is included in the solution. When citric acid and tartaric acid are used, they can be added as the sodium salt or the free acid and are present in the range of from about 3 to 15% by weight of the formulation. When potassium glucarate is used, it is present at about 4 to 20% by weight of the formulation. Sulfuric acid and phosphoric acid can be used as cosolutes in an amount corresponding to about 2 to 10% by weight in the formulation. Although acidic solubilizing agents may be used at relatively low levels, the formulations retain their near neutral to alkaline pH (generally from about 6 to 8) which is desirable for persalt bleaching solutions. Further, upon dilution in the laundry solutions, the formulations will characteristically increase to a higher pH in the range desired for good detergency. For example, dilution of a concentrate containing 9.26 wt. % citric acid and 15.4% sodium perborate (anhydrous basis), with an initial pH of 5.96, to 1% in water gave a pH of 8.63, which increased to 8.7 at 0.2%.

The use of a chelating or sequestering agent is optional but preferred to give optimum stability at high concentrations of perborate or percarbonate. Suitable chelating agents are the well known sequestrants, ethylenediamine tetraacetic acid (sodium salt) and trisodium nitrilotriacetate (NTA). The preferred chelating agents are the complex organo aminophosphonic acid derivatives such as described in U.S. Pat. Nos. 3,234,140 and 4,477,390. A preferred agent is the pentasodium salt of diethylenetriamine penta(methylene phosphonic acid) which is sold as DEQUEST ® 2066 (25% active on free acid basis). The formulations of this invention can contain up to about 5% by weight of the chelating agent with a preferred amount being in the range of from about 0.05% to 0.5% by weight, on an active free acid basis.

The components of the compositions of this invention are dissolved in water, which may be either tap water or purified water such as deionized water, with purified water being preferred. Even purer forms of water, such as deionzed water which has been passed through a carbon column, also can be advantageously used in these solutions. The formulations are prepared by merely dissolving the components in the water which has been heated slightly, such as to about 40° C. The order of addition is not critical, although it appears that there may be some advantages in the sequential, stepwise addition of solubilizing agent followed by perborate. The resultant solution is stirred until all the components are dissolved or nearly dissolved. It has been noted that some of the stabilizing agents have limited water solubility and, as a result, a slight turbidity of the formulated solution may be observed. Some of the turbidity is due to siliceous stabilizers in commercial sodium perborate; it can be readily removed by filtration or by settling followed by decantation. However, this slight turbidity does not detract from the utility of the formulation as a source for active oxygen in laundry solutions.

As pointed out above, the stabilizing agents of the formulations of this invention comprise a water soluble salt of a compound of a formula selected from

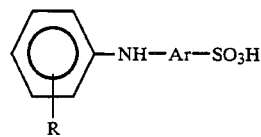

and

-continued

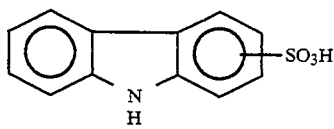

in which Ar is phenyl or naphthyl and R is hydrogen, nitro or chloro. Representative examples of compounds embraced by the above formulae are:

diphenylamine-4-sulfonic acid
diphenylamine-3-sulfonic acid
4-nitrodiphenylamine-4'-sulfonic acid
N-phenyl-2-aminonaphthalene-5-sulfonic acid
3-chlorodiphenylamine-4'-sulfonic acid
4-chlorodiphenylamine-4'-sulfonic acid
4-nitrodiphenylamine-3'-sulfonic acid
2-nitrodiphenylamine-4'-sulfonic acid
N-(4-nitrophenyl)-2-aminonaphthalene-5-sulfonic acid
N-(3-chlorophenyl)-2-aminonaphthalene-5-sulfonic acid
4-nitrodiphenylamine-2'-sulfonic acid
carbazole-3-sulfonic acid
carbazole-4-sulfonic acid The salts are the water-soluble alkali metal and alkaline earth metal salts such as the sodium, potassium, barium, and calcium salts.

The compounds utilized as stabilizing agents according to this invention are commercially available, or can be readily prepared. For example, sodium diphenylamine-4-sulfonate may be obtained from Aldrich Chemical Company and the chloro substituted diphenylamine sulfonic acids can be prepared by sulfonation of the corresponding chloro-substituted diphenylamine with chlorosulfonic acid. The nitro-substituted derivatives are prepared by a displacement reaction between the corresponding fluoro-nitrobenzene and an anilinesulfonic acid salt in the presence of magnesium oxide according to the procedure of Lantz et al., *Bull. Soc. Chim Fr.*, 311 (1956).

Carbazole may also be sulfonated with chlorosulfonic acid, such as by the procedure described by Sumpter et al., *Heterocyclic Compounds*, Vol. 8, Pages 81–82, (1954).

Phenylnaphthylamines can be sulfonated with fuming sulfuric acid, such as according to the procedure of Lesser, *Chem. Ber.* 27, 2363 (1894) and German Patent 70349 (1892), as well as with chlorosulfonic acid.

The alkali metal and alkaline earth metal salts are readily prepared by reaction of the phenylamine-aryl sulfonic acids with the corresponding alkali metal or alkaline earth metal hydroxides or carbonates.

The following examples illustrate the preparation of representative stabilizing agents of this invention.

EXAMPLE I

4-Nitrodiphenylamine-4'-Sulfonic Acid, Sodium Salt

The procedure of R. Lantz and P. Obelliance (*Bull. Soc. Chem. Fr.*, 311, 1956) was followed. A mixture of 6.80 grams of 4-fluoronitrobenzene, 6.92 grams of sulfanilic acid and 4.0 grams of magnesium oxide was prepared in 28 ml. of water containing 3.08 grams of 51.9% sodium hydroxide solution. Heating in a sealed Pyrex tube for 14.5 hours at 167°–172° C. gave a dark amber solution plus solids. Unreacted 4-fluoronitrobenzene was removed by steam distillation and the residue evaporated to dryness in a vacuum. Sodium hydroxide solution (40 ml of 0.25N) was added and the solids removed by filtration. The filtrate was acidified with concentrated HCl, evaporated to dryness in vacuum, and the residue extracted with boiling ethyl alcohol followed by removal of solids by filtration. The ethanolic filtrate was evaporated to dryness in a vacuum, the residual solids redissolved in 25 ml. of water, adjusted to pH 8 with 10% aqueous sodium carbonate solution and evaporated to dryness in vacuum. Crystallization from 9:1 ethanol: water solution gave golden crystals whose proton nuclear magnetic resonance pattern showed two AB quartets at $\sigma$ 7:02 and 8:00 ppm (J=9 Hz, nitrated ring) and at $\sigma$ 7.10 and 7.57 ppm (J=8 Hz, sulfonated ring). A thin layer chromatogram (TLC) on silica gel G using acetone/chloroform/glacial acetic acid/water in a volume ratio of 8:8:4:1 showed a single spot at $R_f$ 0.35.

EXAMPLE II

4-Nitrodiphenylamine-3'-Sulfonic Acid, Sodium Salt

4-Nitrodiphenylamine-3'-sulfonic acid sodium salt was prepared from metanilic acid by the procedure of Example I, but a simplified workup was used in which the product was crystallized directly from 0.5N sodium hydroxide solution after the steam distillation step. The resulting 5.55 grams of orange crystals gave a proton NMR pattern consistent with the desired structure.

EXAMPLE III

4-Nitrodiphenylamine-2'-Sulfonic Acid, Sodium Salt

4-Nitrodiphenylamine-2'-sulfonic acid sodium salt was prepared from aniline-2-sulfonic acid by the procedure of Example II to give beautiful yellow crystals whose proton NMR spectrum was consistent with this structure and which showed a strong TLC spot at $R_f$ 0.67 plus a faint impurity at $R_f$ 0.55.

EXAMPLE IV

3-Chlorodiphenylamine-4'-Sulfonic Acid, Sodium Salt

3-Chlorodiphenylamine-4'-sulfonic acid sodium salt was prepared by adding a solution of 2.86 grams of chlorosulfonic acid in 25 ml. of 1,2-dichlorobenzene dropwise over 15 minutes to an ice-cooled, stirred solution of 5.0 g. of 3-chlorodiphenylamine in 25 ml. of 1,2-dichlorobenzene. After warming to room temperature, the mixture was heated near reflux for 4 hours and then cooled. Extraction with 10% sodium carbonate solution gave a solution which was treated with sodium chloride to give a crude solid. Crystallization of the latter from 60:40 ethanol-isopropanol gave an initial fraction of inorganic salts followed by a product from the filtrate which showed proton NMR peaks at $\sigma$ 8.60 ppm (NH), multiplets at 7.63 and 7.15, plus two aromatic proton peaks at lower field than seen in the starting material. A TLC gave an impurity at $R_f$ 0.37, product at $R_f$ 0.72, and some unreacted starting material at $R_f$ 0.92.

EXAMPLE V

Carbazole-3-Sulfonic Acid, Sodium Salt

A solution of 3.50 grams of chlorosulfonic acid in 20 ml. of chloroform was added dropwise over 30 minutes to a stirred, cooled solution of 5.0 g. of carbazole in 200 ml. of chloroform. After the addition was completed, the mixture was refluxed for 2 hours, cooled, and 100 ml. of 10% $Na_2CO_3$ solution added. The chloroform layer was separated, washed twice with 50 ml. of the $Na_2CO_3$ solutions, and the combined aqueous solutions filtered. Addition of sodium chloride gave a white solid which was removed by filtration and crystallized from aqueous ethanol. The white, crystalline product showed a proton NMR spectrum with NH near 11 ppm plus a complex aromatic region with peaks at lower field than seen in the starting carbazole itself. Comparison of this spectrum with the spectra of other carbazole-3-sulfonates (J. Cislo and A. Hopfringer, *Tenside Detergents*, 13, No. 5, 253-9 (1976)) showed them to be very similar. The TLC had a strong product spot at $R_f$ 0.47 plus an impurity at 0.28.

EXAMPLE VI

N-Phenyl-2-Aminonaphthalene-5-Sulfonic Acid, Sodium Salt

The sulfonation of N-phenyl-2-naphthylamine was carried out using the procedure of R. Lesser, *Chem. Ber.*, 27, 2363 (1894). To 80.2 g. of stirred 100% $H_2SO_4$ was added, with cooling to 20° C., 20.0 g. of N-phenyl-2-naphthylamine. When most of the solids had dissolved, the solution (under a drying tube) was put in a bath at 45° C. overnight. The resulting solution was poured into 250 ml. of ice water with vigorous stirring and the resulting mixture heated to boiling. After cooling, the solids were removed by filtration, washed with water, triturated with 160 ml. of 0,518N sodium hydroxide solution, filtered, and the solids crystallized from hot, aqueous ethanol to give beautiful white flakes. The TLC showed a strong spot at $R_f$ 0.44 with faint impurities at $R_f$ 0.014–0.18. Titration for sulfonate using a solution of diisobutylphenoxyethoxyethyl dimethyl benzylammonium chloride monohydrate (Hyamine ® 1622 from Rohm and Haas) by the procedure reported in *Anionic Surfactants-Chemical Analysis*, Vol. 8 of "Surfactant Science Series", J. Cross, Ed., p. 228 (1977) gave an equivalent weight of 322.9, compared with 325.4 calculated for the sodium salt of N-phenyl-2-naphthylamine-5-sulfonic acid.

EXAMPLE VII

N-Phenyl-2-Aminonaphthlene-8-Sulfonic Acid, Sodium Salt

The sodium hydroxide solution (filtrate) from Example VI above was treated with an equal volume of saturated sodium chloride solution. The resulting precipitate was removed by filtration and air dried to give 16.6 g. of buff-colored solids. Recrystallization from 25 ml. of hot water gave the 8-isomer, whose proton NMR spectrum showed peaks at 6.87 and 6.77 ppm. (2H); 6.31, 6.18, and 6.00 (3H); plus two peaks at 5.53 and 5.60 (7H), consistent with the structure of isomer B reported by Lesser to be the sodium salt of N-phenyl-2-aminonaphthalene-8-sulfonic acid (*Chem. Ber.*, 27, 2363 (1894)). A TLC showed a strong blue fluorescent spot at $R_f$ 0.50 plus faint impurities at $R_f$ 0.10 and 0.33.

EXAMPLE VIII

Diphenylamine-4-Sulfonic Acid, Potassium Salt

To a solution of 4.00 g. (0.0148 mole) of sodium diphenylamine-4-sulfonate in 30 ml. of 0.5152N HCl solution (0.01546 mole) was added potassium hydroxide (0.174 g.) and a total of 8 g. KCl, in increments, with warming after each 2 g. increment to dissolve the KCl. Standing gave off-white plates which were isolated by filtration, washed twice with a small amount of ice water (some product dissolved) and dried to give 0.82 g.

white solids. A small amount of buff-white material was also recovered from the filtrate.

EXAMPLE IX

Diphenylamine-4-Sulfonic Acid, Calcium salt

To a solution of 4.00 g. (0.0148 mole) of sodium diphenylamine-4-sulfonate in 30 ml. of 0.5152N HCl solution (0.01546 mole) was added calcium hydroxide (1.15 g; 0.0155 mole). The mixture was heated to give a thick slurry which was cooled and filtered. The solids were water washed and dried to give 2.70 g. of white solids.

EXAMPLE X

Diphenylamine-4-Sulfonic Acid, Barium Salt

To a solution of 4.00 g. (0.0148 mole) of sodium diphenylamine-4-sulfonate in 30 ml. of 0.5152N HCl solution (0.01546 mole) was added barium hydroxide (2.65 g; 0.0155 mole). The resultant thick slurry was diluted with 50 ml. of deionized water, stirred and heated to boil, and barium chloride dihydrate (2.0 g.) added. The solution was cooled, filtered, the solids washed with water, air dried, and then dried at 50° C., to give 6.44 g. of white solid.

The following examples illustrate persalt compositions containing the stabilizing agents of this invention.

EXAMPLE XI

Five solutions were prepared by dissolving 32.00 g. of sodium perborate tetrahydrate and 41.00 g. of sodium dihydrogen phosphate monohydrate in 100 g. of tap water (corresponding to 9.84% $NaBO_3$ and 20.6% $NaH_2PO_4$). The sodium salt of diphenylamine-4-sulfonic acid (DPAS) was added in the amounts of 0, 0.0017, 0.0087, 0.0346 and 0.173 grams to give final solutions containing 0 to 1005 ppm of the stabilizing agent. The solutions were kept in a constant temperature bath at 30° C. and samples removed weekly for titration with 0.1N $KMnO_4$ solution to determine the active oxygen content. The active oxygen lost as a percentage of the initial value then was calculated. These results are shown in Table I.

TABLE I

Stability of Sodium Perborate/Dihydrogen Phosphate Solutions with 0–1005 ppm DPAS at 30° C.

| DPAS ppm | Percent Active Oxygen Lost Days | | | | | | |
|---|---|---|---|---|---|---|---|
| | 7 | 14 | 21 | 28 | 35 | 42 | 49 |
| 0 | 7.8 | 19.3 | 30.7 | 41.4 | 49.8 | 57.0 | 63.9 |
| 10 | 2.4 | 6.9 | 13.1 | 17.4 | 24.8 | 29.8 | 34.7 |
| 50 | 1.4 | 3.5 | 8.6 | 12.7 | 19.2 | 24.8 | 29.8 |
| 200 | 2.4 | 2.4 | 2.4 | 2.9 | 7.2 | 11.7 | 16.5 |
| 1005 | 3.3 | 3.8 | 4.8 | 4.5 | 5.4 | 6.1 | 7.0 |

It is seen that excellent stabilization was achieved at 1005 ppm. of the DPAS stabilizer and that significant activity was observed at only 10 ppm.

EXAMPLE XII

Four solutions were prepared by dissolving 28.2 g. of sodium perborate tetrahydrate, 28.2 g of boric acid, and 1.00 g. of DEQUEST 2066 (30% pentasodium salt of diethylenetriamine penta(methylene phosphonic acid) in aqueous solution) in 100 g. of tap water. This corresponds to 9.52% $NaBO_3$, 17.9% $H_3BO_3$ and 1588 ppm. diethylenetriamine penta(methylene phosphonic acid). To each of three solutions was added 0.0787 g. (500 ppm.) of the indicated stabilizing agent. The fourth solution, containing no stabilizer, was included as a control.

The four solutions were held at 45° C. for 14 days and the active oxygen content determined at the indicated intervals. The results are given in Table II.

TABLE II

Stability of Sodium Perborate/Boric Acid Solutions at 45° C.

| Additive* | Percent Active Oxygen Lost Days | | | |
|---|---|---|---|---|
| | 1 | 5 | 9 | 14 |
| None | 3.3 | 11.0 | 18.7 | 28.8 |
| DPAS | 3.7 | 7.6 | 14.6 | 25.8 |
| Cmpd I | 1.6 | 6.2 | 9.4 | 13.6 |
| Cmpd II | 2.2 | 5.9 | 9.4 | 14.1 |

*DPAS Diphenylamine-4-sulfonic acid, sodium salt.
Cmpd I 4-Nitrodiphenylamine-4'-sulfonic acid, sodium salt.
Cmpd II 4-Nitrodiphenylamine-3'-sulfonic acid, sodium salt.

These data show that, even in solutions already stabilized by a sequestrant (DEQUEST), the stabilizing agents of this invention impart significantly more stability.

EXAMPLE XIII

Aqueous solutions were prepared containing 33.3 g. (10.6% $NaBO_3$) of sodium perborate tetrahydrate, 33.3 g. (17.4% $NaH_2PO_4$) of sodium dihydrogen phosphate monohydrate, and 0.167 g. (1000 ppm.) of various additives in 100 g. of deionized water. These solutions were maintained at 45° C. in a constant temperature bath for 14 days, with samples taken periodically for active oxygen analysis by potassium permanganate titration. The stability test results are set forth in Table III.

TABLE III

Stability Test Data for Sodium Perborate/Sodium Dihydrogen Phosphate Solutions at 45° C.

| Additive* | Percent Active Oxygen Lost Days | | | |
|---|---|---|---|---|
| | 1 | 6 | 11 | 14 |
| None | 14.4 | 82.7 | 98.2 | 99.7 |
| DPAS | 0.8 | 10.6 | 59.6 | 79.9 |
| DPAS | 0.4 | 9.7 | 54.8 | 77.0 |
| DPAS | 0.7 | 11.4 | 55.4 | 77.0 |
| Cmpd. VI | 0.0 | 17.5 | 34.2 | 42.5 |
| Cmpd. VII | 0.4 | 43.7 | 87.1 | 95.4 |
| Cmpd. V | 2.4 | 18.50 | 63.4 | 85.6 |
| Cmpd. I | 0.0 | 7.0 | 18.8 | 30.4 |
| Cmpd. I | 0.0 | 7.2 | 17.2 | 25.2 |
| Cmpd. I | 0.0 | 8.2 | 19.3 | 31.2 |
| Cmpd. III | 1.3 | 19.1 | 65.0 | 82.6 |
| Cmpd. II | 0.0 | 7.9 | 21.4 | 42.3 |
| None | 14.0 | 81.6 | 97.4 | 99.1 |

*DPAS Diphenylamine-4-sulfonic acid, sodium salt.
Cmpd. VI N-Phenyl-2-aminonaphthalene-5-sulfonic acid, sodium salt.
Cmpd. VII N-Phenyl-2-aminonaphthalene-8-sulfonic acid, sodium salt
Cmpd. V Carbazole-3-sulfonic acid, sodium salt.
Cmpd. I 4-Nitrodiphenylamine-4'-sulfonic acid, sodium salt.
Cmpd. III 4-Nitrodiphenylamine-2'-sulfonic acid, sodium salt.
Cmpd. II 4-Nitrodiphenylamine-3'-sulfonic acid, sodium salt.

The data shows that sodium 4-nitrodiphenylamine-4'-sulfonate (Cmpd. I) is a preferred stabilizer in deionized water. Although Cmpd. VII showed improved stability compared with the control after 6 and 11 days, the activity dropped off at 14 days.

EXAMPLE XIV

Aqueous solutions were prepared containing 33.3 g. of sodium perborate tetrahydrate and 33.3 g. of sodium dihydrogen phosphate monohydrate in 100 g. of tap water. The sodium salt of diphenylamine-4-sulfonic acid (DPAS, 1001 ppm.) was added to one solution and 0.188 g. (1127 ppm.) of 3-chlorodiphenylamine-4'-sulfonic acid, sodium salt (Cmpd. IV) to the other. After 14 days at 45° C., 77.5% of the initial active oxygen had been lost from the DPAS solution and 54.1% from the solution containing Cmpd. IV.

EXAMPLE XV

Seven solutions were prepared in deionized water as in Example XIII, and the barium, calcium, and potassium salts of diphenylamine-4-sulfonic acid tested as stabilizers with and without diethylenetriamine penta(methylene phosphonic acid) (DTPA) chelating agent present. The results of active oxygen analyses over a 14 day period at 45° C. are given in Table IV.

TABLE IV

Stability of Sodium Perborate/Dihydrogen Phosphate Solutions* at 45° C.

| Additive Salt | ppm | DTPA, ppm | % Active Oxygen Lost Days | | |
|---|---|---|---|---|---|
| | | | 2 | 7 | 14 |
| None | 0 | 0 | 31.0 | 80.6 | 98.1 |
| K | 1000 | 0 | 4.7 | 14.6 | 70.1 |
| Ca | 1000 | 0 | 4.3 | 14.5 | 71.2 |
| Ba | 1000 | 0 | 3.8 | 17.4 | 76.4 |
| K | 995 | 1490 | 4.0 | 11.7 | 49.2 |
| Ca | 995 | 1490 | 3.9 | 12.1 | 49.8 |
| Ba | 995 | 1490 | 4.5 | 13.2 | 52.0 |

*10.64% $NABO_3$ and 17.39% $NAH_2PO_4$ in deionized water.

These data clearly show that the potassium, calcium, and barium salts all are effective stabilizers, alone and in combination with the sequestrant.

EXAMPLE XVI

Boric Acid (14.0 g.) and sodium percarbonate ($2Na_2CO_3 \cdot 3H_2O_2$, 85%, 14.0 g.) were dissolved in 100 g. of deionized water, in portions, with about one-third of the boric acid added first and dissolved followed by one-third of the percarbonate. This was repeated until all of the boric acid and sodium percarbonate had been dissolved to give solutions containing 10.9% boric acid and 9.3% sodium percarbonate. To the solutions were added 1654 ppm. DTPA chelating agent and 1001 ppm. of the indicated additives. The results of following the loss of active oxygen over a 14 day period at 45° C. are given in Table V.

TABLE V

Stability of Sodium Percarbonate/Boric Acid Solutions at 45° C.

| Additive Name* | ppm | DTPA ppm | Percent Active Oxygen Lost Days | | | |
|---|---|---|---|---|---|---|
| | | | 3 | 6 | 9 | 14 |
| None | 0 | 0 | 85.9 | 91.8 | 94.9 | 95.7 |
| None | 0 | 0 | 85.9 | 91.1 | 94.4 | 94.8 |
| DPAS | 1001 | 1654 | 35.2 | 50.9 | 66.1 | 74.3 |
| Cmpd. I | 1001 | 1654 | 37.5 | 53.4 | 65.9 | 73.6 |
| None | 0 | 1654 | 51.9 | 64.1 | 72.4 | 77.0 |

*DPAS Diphenylamine-4-sulfonic acid, sodium salt.
Cmpd. I 4-Nitrodiphenylamine-4'-sulfonic acid, sodium salt.

EXAMPLE XVII

Test solutions were prepared by dissolving 25.0 g. of sodium perborate tetrahydrate and 1220 ppm. of pentasodium diethylenetriamine penta(methylene phosphonic acid) (as DEQUEST 2066) in 100 g. of 1N sulfuric acid solution in tap water to give 10.58% $NaBO_3$, 3.9% $H_2SO_4$ and 1220 ppm. of the DTPA chelating agent. Stabilizing agents were added as indicated and controls (with and without the DTPA) were included. The active oxygen content of these solutions was monitored for 14 days while maintained at 45° C. in a constant temperature bath. The active oxygen losses are reported in Table VI.

TABLE VI

Stability of $PBS_4/H_2SO_4$ Solutions, 45° C.

| Stabilizer Additive* | ppm | Percent Active Oxygen Lost Days | |
|---|---|---|---|
| | | 4 | 14 |
| None | — | 7.0 | 24.2 |
| DPAS | 504 | 6.0 | 22.5 |
| Cmpd. I | 584 | 3.9 | 15.1 |
| Cmpd. III | 584 | 5.1 | 16.9 |
| Control | (No DTPA) | 68.4 | 98.6 |

*DPAS Diphenylamine-4-sulfonic acid, Na salt.
Cmpd. I 4-Nitrodiphenylamine-4'-sulfonic acid, Na salt.
Cmpd. III 4-Nitrodiphenylamine-2'-sulfonic acid, Na salt.

EXAMPLE XVIII

Test solutions were prepared by dissolving 40.0 g. of sodium hydrogen (+) tartrate and 40.0 g. of sodium perborate tetrahydrate in 100 g. of tap water to give 11.82% $NaBO_3$ and 22.23% sodium hydrogen (+) tartrate. Tetrasodium ethylenediamine tetraacetate (EDTA) was added and 500 ppm. of sodium diphenylamine-4-sulfonate added as a stabilizer. The solutions were maintained at 30° C. and the active oxygen content was determined as a function of time for each of the solutions. The results are shown in Table VII.

TABLE VII

Stability of $PBS4/Na_aH(+)$Tartrate Solutions

| EDTA ppm* | DPAS** ppm | Percent Active Oxygen Lost Days | | | |
|---|---|---|---|---|---|
| | | 0 | 7 | 14 | 21 |
| 1178 | None | 2.5 | 16.6 | 85.3 | 89.8 |
| 2356 | None | 2.8 | 44.4 | 82.4 | 87.8 |
| 1178 | 500 | 0 | 16.8 | 44.8 | 75.2 |
| 2356 | 500 | 0 | 16.4 | 55.9 | 85.3 |

*As free acid
**Sodium diphenylamine-4-sulfonate.

EXAMPLE XIX

Three solutions were prepared containing 33.3 g. of sodium perborate tetrahydrate and 33.33 g. of sodium dihydrogen phosphate monohydrate in tap water. The first solution had no additives and 100 g. of tap water, the second contained 99.7 g. of water plus 0.285 g. of tetrasodium ethylenediaminetetraacetate dihydrate (EDTA) (1201 ppm. as free acid) and the third solution had a combination of 0.285 g. of EDTA plus 0.167 g. of sodium diphenylamine-4-sulfonate in 99.5 g. of water. After aging for 14 days at 45° C., the solutions had lost 98.8, 91.4 and 72.4% respectively, of their initial active oxygen content.

EXAMPLE XX

Three solutions were prepared containing 28.1 g. each of sodium perborate tetrahydrate and of boric acid. The first solution (no additive) was prepared in 100 g. of tap water, the second in 99.7 g. of water with 0.285 g. of EDTA (1281 ppm as free acid), and the third in 99.5 g. of water with a combination of 0.285 g. of EDTA and 0.167 g. of sodium diphenylamine-4-sulfonate. After aging at 45° C. for 14 days, the solutions had lost 81.1, 31.5 and 25.5%, respectively, of their initial active oxygen content.

EXAMPLE XXI

Comparative Test

In a comparative test, aqueous solutions containing 10.6% $NaBO_3$ and 17.4% $NaH_2PO_4$ in deionized water were prepared. Various stabilizing agents were added at a level of 1000 ppm. and the solutions maintained at 45° C. for 14 days. Samples were taken periodically for active oxygen analysis by potassium permanganate titration. Included in the test were two N-aralkyl substituted compounds (A and B) which are embraced by the generic formula of U.S. Pat. No. 2,012,462. The results are set forth in Table VIII.

TABLE VIII

| Additive* | Percent Active Oxygen Lost Days | | | | |
|---|---|---|---|---|---|
| | 0 | 1 | 6 | 9 | 14 |
| None (Control) | 0 | 23.5 | 69.8 | 86.7 | 97.5 |
| Cmpd. A | 0 | 2.6 | 24.2 | 50.9 | 81.7 |
| Cmpd. B | 0 | 21.5 | 65.3 | 82.6 | 94.2 |
| DPAS | 0 | 3.8 | 10.5 | 32.4 | 75.5 |
| Cmpd. I | 0 | 1.5 | 7.7 | 12.9 | 25.6 |
| Cmpd. II | 0 | 1.4 | 8.8 | 15.7 | 40.6 |
| Cmpd. VI | 0 | 3.5 | 15.2 | 26.2 | 44.7 |

*Cmpd. A N-benzyl-N-ethyl-4-sulfanilic acid, sodium salt
Cmpd. B N-benzyl-4-sulfanilic acid, sodium salt
DPAS Diphenylamine-4-sulfonic acid, sodium salt
Cmpd. I 4-nitrodiphenylamine-4'-sulfonic acid, sodium salt
Cmpd. II 4-nitrodiphenylamine-3'-sulfonic acid, sodium salt
Cmpd. VI N-phenyl-2-aminonaphthalene-5-sulfonic acid, sodium salt It is clear that the stabilizing agents of this invention are far superior to the N-benzyl substituted compounds disclosed by U.S. Pat. No. 2,012,462.

In a preferred embodiment, the stabilized persalt bleaching compositions of this invention contain acid phosphate ester surfactants. These surfactants act as hydrotropes to allow the ready introduction of nonionic surfactants into the formulations. The resultant bleach-surfactant formulations give exceptional bleaching activity which is superior to that obtained with conventional acidic hydrogen peroxide bleaching compositions now available. Examples of such acid phosphate ester surfactants that are commercially available are GAFAC RA-600, produced by Rhone Poulenc, ACTRAFOS SP-407, produced by Climax Performance Materials, and TRITON QS-44, produced by Rohm & Haas.

EXAMPLE XXII

A liquid sodium perborate bleach formulation was prepared in purified water using phosphoric acid and GAFAC RA-600, an acid phosphate ester surfactant, as cosolutes. A fluorescent whitening agent, a dye, and a defoamer also were incorporated, along with a phosphonate chelating agent and sodium diphenylamine-4-sulfonate as stabilizer. The complete formulation is shown in Table IX (Formulation 51).

TABLE IX

| Formulation 51 | | |
|---|---|---|
| Component | Weight/g. | Weight Percent or ppm |
| Sodium perborate .4H$_2$O | 28.39 | 17.00% |
| Phosphoric Acid (85%) | 9.19 | 4.68% |
| GAFAC RA-600$^b$ | 4.18 | 2.50% |

TABLE IX-continued

| Formulation 51 | | |
|---|---|---|
| Component | Weight/g. | Weight Percent or ppm |
| TRITON X-100$^c$ | 4.18 | 2.50% |
| TINOPAL CBS-X$^d$ | 0.167 | 1000 ppm |
| DEQUEST 2066 | 0.50 | 749 ppm$^e$ |
| DPAS$^f$ | 0.084 | 503 ppm |
| Acid Blue 80$^g$ | 8.4 × 10$^{-4}$ | 5 ppm |
| Defoamer$^h$ | 0.03 | 180 ppm |
| Purified Water (MQ) | 120.28 | |
| Total | 167.00 | |

$^a$Active H$_3$PO$_4$; 5.50% OF 85%.
$^b$Acid phosphate ester of an ethoxylated linear alcohol, hydrotrope/surfactant.
$^c$Isoctylphenol ethoxylate nonionic surfactant.
$^d$Distyryl biphenyl fluorescent whitening agent.
$^e$Active acid basis.
$^f$Sodium diphenylamine-4-sulfonate.
$^g$Anthraquione dye.
$^h$Silicone type.

The solution was green due to the development of a yellow tint, and was clear after decantation away from some settled silica introduced with the commercial sodium perborate tetrahydrate. It had pH 6.31 and 1.81% active oxygen. Storage in a closed glass container for one year at 20°–25° C. in the dark gave no change in appearance, no separation of crystals, and an active oxygen content of 1.70%. Cold storage (6°–10° C.) for 7 weeks gave no separation of crystals. Dilution to 0.3% in water gave a pH of 8.1. Such increases in pH on dilution are characteristic of the concentrated perborate solutions of this invention, and this is an advantage over acidic formulations based on hydrogen peroxide currently being sold as color safe bleaches. One such product has a pH of 4.03 which increases to only 4.76 on dilution to 0.3%.

Efficacy tests were run using tea-stained cotton swatches in a Terg-O-Tometer laboratory apparatus on a 1 liter scale. A standard sodium tripolyphosphate/anionic surfactant detergent was used (0.17%) with and without sodium perborate monohydrate (PBS1), with Formulation 51, and with an acidic hydrogen peroxide-based product. The peroxygen bleaches were used in amounts to give the same total active oxygen in the wash liquor. The cotton swatches were washed in 10 grain hardness water for 15 minutes at 50° C. Two 5 minute rinses at room temperature were used. The results are shown in Table X. The results show better performance by the formulation of this invention than by the perborate alone or by the acidic hydrogen peroxide formulation of commerce.

TABLE X

| Additives | Percent Stain Removal |
|---|---|
| None | 22.5 |
| PBST (0.30 g) | 29.2 |
| Formulation 51 (2.75 g)$^a$ | 44.9 |
| Liquid H$_2$O$_2$ bleach (3.00 g)$^b$ | 34.9 |

$^a$1.74% act. oxygen.
$^b$1.61% act. oxygen.

Further tests were run using a liquid detergent in combination with Formulation 51. In this case, wine-stained 50:50 cotton/polyester fabric swatches were washed for 10 minutes at 50° C. The results in Table XI show marked improvement in wine stain removal over the liquid detergent used alone when the liquid bleach formulation of this invention is included.

TABLE XI

| Additive(s) (g/L) | Percent Stain Removal |
| --- | --- |
| Liquid Detergent (2.18) | 38.9 |
| Liquid Detergent + Form. 51 (2.75) | 51.0 |

Another formulation was prepared based on boric acid as a cosolute for sodium perborate tetrahydrate (PBS4). This formulation (Table XII) illustrates the dramatic increase in pH on dilution, going from an initial value of 6.75 to 8.92 at 0.3%. The formulation had an active oxygen content of 1.83% which dropped to 1.77% after 6 weeks at 20°–25° C., and to 1.66% after 12 weeks. Some crystals of perborate had separated at 12 weeks and the pH had dropped to 6.70.

TABLE XII

| Formulation 93 | |
| --- | --- |
| Additive(s) (g/L) | Amount |
| Surfactants[a] | 5.0% |
| PBS4 | 17.0% |
| Boric Acid | 13.4% |
| TINOPAL CBS-X | 1000 ppm |
| DPAS[b] | 500 ppm |
| DEQUEST 2066 | 750 ppm[c] |
| Water | Balance |

[a] 2.5% acid phosphate ester surfactant GAFAC RA-600 and 2.5% TRITON X-100.
[b] Sodium diphenylamine-4-sulphonate.
[c] Active acid basis.

Terg-O-Tometer tests on wine-stained 50/50 cotton/polyester fabric are shown in Table XIII. The fabric was washed for 10 minutes at 50° C. in 10 grain hardness water. Dramatic improvement in stain removal is seen over the liquid detergent alone, which is greatly enhanced by addition of the known activator, tetraacetylethylenediamine (TAED). The performance of Formulation 93 also was better than that of the acidic hydrogen peroxide-based formulation of commerce.

TABLE XIII

| Additive(s) (g/L) | Percent Stain Removal |
| --- | --- |
| Liquid Detergent (2.07) | 26.8 |
| Liquid Detergent + Form. 93 (2.75) | 47.9 |
| Liquid Detergent + Form. 93 + TAED (0.20) | 69.5 |
| Liquid Detergent + H₂O₂ bleach (3.00) | 43.1 |

Various changes and modifications of the invention can be made and, to the extent that such variations incorporate the spirit of this invention, they are intended to be included within the scope of the appended claims.

What is claimed is:

1. A stable, concentrated aqueous laundry persalt solution having a pH of from about 6 to 8, comprising about 5 to 30% of sodium perborate or sodium percarbonate, about 0.05 to 5% chelating agent, about 3 to 30% solubilizing agent, about 0.001 to 1.0% of a water soluble salt of a stabilizing agent of a formula selected from the group consisting of

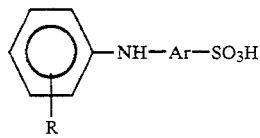

and

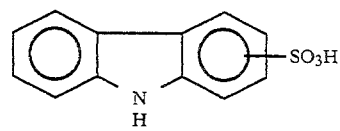

where Ar is phenyl or naphthyl and R is hydrogen, nitro or chloro, and the balance is water, said percentages by weight.

2. An aqueous solution in accordance with claim 1 in which said solubilizing agent is phosphoric acid or sodium dihydrogen phosphate.
3. An aqueous solution in accordance with claim 1 in which said solubilizing agent is boric acid.
4. An aqueous solution in accordance with claim 1 in which said chelating agent is pentasodium diethylenetriamine penta(methylene phosphonate).
5. An aqueous solution in accordance with claim 1 in which said chelating agent is tetrasodium ethylenediamine tetraacetate.
6. An aqueous solution in accordance with claim 1 in which said stabilizing agent is a sodium salt.
7. An aqueous solution in accordance with claim 1 in which said stabilizing agent is sodium diphenylamine-4-sulfonate.
8. An aqueous solution in accordance with claim 1 in which said stabilizing agent is sodium 4-nitrodiphenylamine-4'-sulfonate.
9. An aqueous solution in accordance with claim 1 in which said stabilizing agent is sodium carbazole-3-sulfonate.
10. An aqueous solution in accordance with claim 1 in which said persalt is sodium perborate.
11. An aqueous solution in accordance with claim 1 in which an organic surfactant is included.
12. An aqueous solution in accordance with claim 11 in which said surfactant is an acid phosphate ester surfactant.
13. In a concentrated aqueous laundry bleach solution comprising about 5 to 30 wt. % of sodium perborate, about 0.05 to 0.5 wt. % of a chelating agent and about 3 to 30 wt. % of a solubilizing agent, the improvement which comprises including about 0.001 to 1.0 wt. % of a stabilizing agent which is a water soluble salt of a compound of a formula selected from the group consisting of

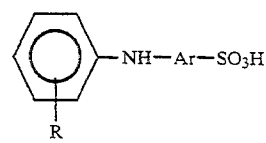

and

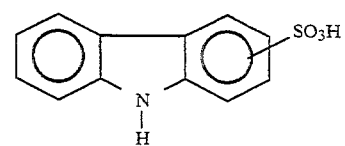

where Ar is phenyl or naphthyl and R is hydrogen, nitro or chloro, thereby improving the stability of said sodium perborate and retarding the loss of active oxygen from said solution on storage, said stabilized solution having a pH of from about 6 to 8.

14. The improvement in accordance with claim 13 in which said stabilizing agent is sodium diphenylamine-4-sulfonate.

15. The improvement in accordance with claim 13 in which said stabilizing agent is sodium 4-nitrodiphenylamine-4'-sulfonate.

16. The improvement in accordance with claim 13 in which said stabilizing agent is sodium carbazole-3-sulfonate.

17. In the method of stabilizing an aqueous laundry persalt bleach solution having a pH of from about 6 to 8, the improvement which comprises adding to said solution about 0.001 to 1.0%, by weight, of a water soluble salt of a stabilizing agent of a formula selected from the group consisting of

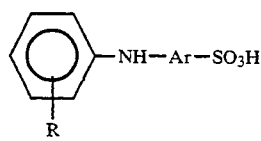

and

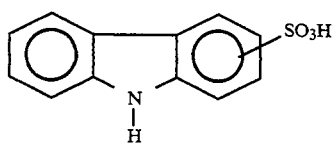

where Ar is phenyl or naphthyl and R is hydrogen, nitro or chloro.

18. The method according to claim 17 in which said persalt is sodium perborate.

19. The method according to claim 17 in which said persalt is sodium percarbonate.

20. The method according to claim 17 in which said stabilizing agent is sodium diphenylamine-4-sulfonate.

21. The method according to claim 17 in which said stabilizing agent is sodium 4-nitrodiphenylamine-4'-sulfonate.

22. The method according to claim 17 in which an acid phosphate ester surfactant is included in said persalt solution.

* * * * *